United States Patent
Yu et al.

(10) Patent No.: US 12,167,369 B2
(45) Date of Patent: Dec. 10, 2024

(54) METHOD AND USER EQUIPMENT FOR RESOURCE SELECTION APPROACH ADAPTATION

(71) Applicant: SHARP KABUSHIKI KAISHA, Sakai (JP)

(72) Inventors: Chia-Hao Yu, Taipei (TW); Yung-Lan Tseng, Taipei (TW); Hsin-Hsi Tsai, Taipei (TW); Hung-Chen Chen, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 235 days.

(21) Appl. No.: 17/326,547

(22) Filed: May 21, 2021

(65) Prior Publication Data

US 2021/0368479 A1 Nov. 25, 2021

Related U.S. Application Data

(60) Provisional application No. 63/028,502, filed on May 21, 2020.

(51) Int. Cl.
*H04W 72/02* (2009.01)
*H04L 1/1822* (2023.01)
(Continued)

(52) U.S. Cl.
CPC ........... *H04W 72/02* (2013.01); *H04L 1/1822* (2013.01); *H04W 52/0216* (2013.01);
(Continued)

(58) Field of Classification Search
CPC . H04W 72/02; H04W 76/28; H04W 52/0216; H04W 52/0229; H04W 52/0241; H04L 1/1822
See application file for complete search history.

(56) References Cited

U.S. PATENT DOCUMENTS

2020/0112982 A1* 4/2020 Li ................... H04W 76/14
2022/0346179 A1* 10/2022 Yang ............... H04W 76/34
2023/0164813 A1* 5/2023 Guo ................ H04W 52/0212
370/311

FOREIGN PATENT DOCUMENTS

KR 102467308 B1 * 3/2020

OTHER PUBLICATIONS

3GPP TS 38.213, "3rd Generation Partnership Project; Technical Specification Group Radio Access Network; NR; Physical layer procedures for control (Release 16)", V16.1.0 (Mar. 2020).
(Continued)

*Primary Examiner* — Jasper Kwoh
(74) *Attorney, Agent, or Firm* — ScienBiziP, P.C.

(57) ABSTRACT

A method and a user equipment (UE) for resource selection approach adaptation are provided. The method includes receiving, from a Base Station (BS), a first Sidelink (SL) transmission resource pool configuration and a second SL transmission resource pool configuration; performing a first resource selection on a first SL transmission resource pool by applying a first resource selection approach; receiving, from the BS, an adaption indication that a second resource selection approach is to be applied; performing, during a transition period between a time at which the adaption indication is received and a time at which the second resource selection approach is applied, a second resource selection on a second SL transmission resource pool by applying a third resource selection approach; and performing, after the transition period, a third resource selection on the first SL transmission resource pool by applying the second resource selection approach indicated by the adaption indication.

20 Claims, 4 Drawing Sheets

(51) Int. Cl.
H04W 52/02 (2009.01)
H04W 76/28 (2018.01)
(52) U.S. Cl.
CPC ... *H04W 52/0229* (2013.01); *H04W 52/0241* (2013.01); *H04W 76/28* (2018.02)

(56) References Cited

OTHER PUBLICATIONS

3GPP TS 38.212, "3rd Generation Partnership Project; Technical Specification Group Radio Access Network; NR; Multiplexing and channel coding (Release 16)", V16.1.0 (Mar. 2020).
3GPP TS 38.214, "3rd Generation Partnership Project; Technical Specification Group Radio Access Network; NR; Physical layer procedures for data (Release 16)", V16.1.0 (Mar. 2020).
3GPP TS 38.215, "3rd Generation Partnership Project; Technical Specification Group Radio Access Network; NR; Physical layer measurements (Release 16)", V16.1.0 (Mar. 2020).
3GPP TS 38.300, "3rd Generation Partnership Project; Technical Specification Group Radio Access Network; NR; NR and NG-RAN Overall Description; Stage 2 (Release 16)", V16.1.0 (Mar. 2020).
3GPP TS 38.304, "3rd Generation Partnership Project; Technical Specification Group Radio Access Network; NR; User Equipment (UE) procedures in Idle mode and RRC Inactive state (Release 16)", V16.1.0 (Jul. 2020).
3GPP TS 38.305, "3rd Generation Partnership Project; Technical Specification Group Radio Access Network; NG Radio Access Network (NG-RAN); Stage 2 functional specification of User Equipment (UE) positioning in NG-RAN (Release 16)", V16.1.0 (Jul. 2020).
3GPP TS 38.306, "3rd Generation Partnership Project; Technical Specification Group Radio Access Network; NR; User Equipment (UE) radio access capabilities (Release 16)", V16.1.0 (Jul. 2020).
3GPP TS 38.307, "3rd Generation Partnership Project; Technical Specification Group Radio Access Network; NR; Requirements on User Equipments (UEs) supporting a release-independent frequency band (Release 16)", V16.1.0 (Dec. 2019).
3GPP TS 38.314, "3rd Generation Partnership Project; Technical Specification Group Radio Access Network; NR; Layer 2 Measurements; (Release 16)", V16.1.0 (Sep. 2020).
3GPP TS 38.321, "3rd Generation Partnership Project; Technical Specification Group Radio Access Network; NR; Medium Access Control (MAC) protocol specification (Release 16)", V16.1.0 (Jul. 2020).
3GPP TS 38.322, "3rd Generation Partnership Project; Technical Specification Group Radio Access Network; NR; Radio Link Control (RLC) protocol specification (Release 16)", V16.1.0 (Jul. 2020).
3GPP TS 38.323, "3rd Generation Partnership Project; Technical Specification Group Radio Access Network; NR; Packet Data Convergence Protocol (PDCP) specification (Release 16)", V16.1.0 (Jul. 2020).
3GPP TS 38.331, "3rd Generation Partnership Project; Technical Specification Group Radio Access Network; NR; Radio Resource Control (RRC) protocol specification (Release 16)", V16.1.0 (Jul. 2020).
3GPP TS 38.340, "3rd Generation Partnership Project; Technical Specification Group Radio Access Network; NR; Backhaul Adaptation Protocol (BAP) specification (Release 16)", V16.1.0 (Jul. 2020).
3GPP TS 38.401, "3rd Generation Partnership Project; Technical Specification Group Radio Access Network; NG-RAN; Architecture description (Release 16)", V16.1.0 (Mar. 2020).
3GPP TS 38.410, "3rd Generation Partnership Project; Technical Specification GroupRadio Access Network; NG-RAN; NG general aspects and principles (Release 16)", V16.1.0 (Mar. 2020).
3GPP TS 38.412, "3rd Generation Partnership Project; Technical Specification Group Radio Access Network; NG-RAN; NG signalling transport (Release 16)", V16.1.0 (Sep. 2020).
3GPP TS 38.413, "3rd Generation Partnership Project; Technical Specification Group Radio Access Network; NG-RAN; NG Application Protocol (NGAP) (Release 16)", V16.1.0 (Mar. 2020).
3GPP TS 38.415, "3rd Generation Partnership Project; Technical Specification Group Radio Access Network; NG-RAN; PDU Session User Plane Protocol (Release 16)", V16.1.0 (Jul. 2020).
3GPP TR 38.807, "3rd Generation Partnership Project; Technical Specification Group Radio Access Network; Study on requirements for NR beyond 52.6 GHZ (Release 16)", V16.1.0 (Mar. 2021).
3GPP TR 38.809, "3rd Generation Partnership Project; Technical Specification Group Radio Access Network; NR; Background for Integrated access and backhaul radio transmission and reception (Release 16)", V16.1.0 (Dec. 2020).
3GPP TR 38.810, "3rd Generation Partnership Project; Technical Specification Group Radio Access Network; NR; Study on test methods; (Release 16)", V16.1.0 (Dec. 2018).
3GPP TR 38.817-01, "3rd Generation Partnership Project; Technical Specification Group Radio Access Network; General aspects for User Equipment (UE) Radio Frequency (RF) for NR (Release 16)", V16.1.0 (Sep. 2019).
3GPP TR 38.820, "3rd Generation Partnership Project; Technical Specification Group Radio Access Network; NR; 7-24 GHz frequency range (Release 16)", V16.1.0 (Mar. 2021).
3GPP TR 38.821, "3rd Generation Partnership Project; Technical Specification Group Radio Access Network; Solutions for NR to support non-terrestrial networks (NTN) (Release 16)", V16.1.0 (May 2021).
3GPP TR 38.822, "3rd Generation Partnership Project; Technical Specification Group Radio Access Network; NR; User Equipment (UE) feature list (Release 16)", V16.1.0 (Sep. 2021).
3GPP TR 38.827, "3rd Generation Partnership Project; Technical Specification Group Radio Access Network; Study on radiated metrics and test methodology for the verification of multi-antenna reception performance of NR User Equipment (UE); (Release 16)", V16.1.0 (Dec. 2020).
3GPP TS 38.423, "3rd Generation Partnership Project; Technical Specification Group Radio Access Network; NG-RAN; Xn application protocol (XnAP) (Release 16)", V16.1.0 (Mar. 2020).
3GPP TS 38.425, "3rd Generation Partnership Project; Technical Specification Group Radio Access Network; NG-RAN; NR user plane protocol (Release 16)", V16.1.0 (Jul. 2020).
3GPP TS 38.455, "3rd Generation Partnership Project; Technical Specification Group Radio Access Network; NG-RAN; NR Positioning Protocol A (NRPPa) (Release 16)", V16.1.0 (Sep. 2020).
3GPP TS 38.460, "3rd Generation Partnership Project; Technical Specification Group Radio Access Network; NG-RAN; E1 general aspects and principles (Release 16)", V16.1.0 (Jul. 2020).
3GPP TS 38.462, "3rd Generation Partnership Project; Technical Specification Group Radio Access Network; NG-RAN; E1 signalling transport (Release 16)", V16.1.0 (Sep. 2020).
3GPP TS 38.463, "3rd Generation Partnership Project; Technical Specification Group Radio Access Network; NG-RAN; E1 Application Protocol (E1AP) (Release 16)", V16.1.0 (Mar. 2020).
3GPP TS 38.470, "3rd Generation Partnership Project; Technical Specification Group Radio Access Network; NG-RAN; F1 general aspects and principles (Release 16)", V16.1.0 (Mar. 2020).
3GPP TS 38.472, "3rd Generation Partnership Project; Technical Specification Group Radio Access Network; NG-RAN; F1 signalling transport (Release 16)", V16.1.0 (Sep. 2020).
3GPP TS 38.473, "3rd Generation Partnership Project; Technical Specification Group Radio Access Network; NG-RAN; F1 application protocol (F1AP) (Release 16)", V16.1.0 (Mar. 2020).
3GPP TS 38.474, "3rd Generation Partnership Project; Technical Specification Group Radio Access Network; NG-RAN; F1 data transport (Release 16)", V16.1.0 (Jan. 2021).
3GPP TS 38.508-2, "3rd Generation Partnership Project; Technical Specification Group Radio Access Network; 5GS; User Equipment (UE) conformance specification; Part 2: Common Implementation Conformance Statement (ICS) proforma (Release 16)", V16.1.0 (Sep. 2019).
3GPP TS 38.508-1, "3rd Generation Partnership Project; Technical Specification Group Radio Access Network; 5GS; User Equipment (56) References Cited

OTHER PUBLICATIONS (UE) conformance specification; Part 1: Common test environment (Release 16)", V16.1.0 (Sep. 2019).
3GPP TS 38.509, "3rd Generation Partnership Project; Technical Specification Group Radio Access Network; 5GS; Special conformance testing functions for User Equipment (UE) (Release 16)", V16.1.0 (Jun. 2021).
3GPP TS 38.521-1, "3rd Generation Partnership Project; Technical Specification Group Radio Access Network; NR; User Equipment (UE) conformance specification; Radio transmission and reception; Part 1: Range 1 Standalone; (Release 16)", V16.1.0 (Sep. 2019).
3GPP TS 38.521-2, "3rd Generation Partnership Project; Technical Specification Group Radio Access Network; NR; User Equipment (UE) conformance specification; Radio transmission and reception; Part 2: Range 2 Standalone (Release 16) ", V16.1.0 (Sep. 2019).
3GPP TS 38.521-3, "3rd Generation Partnership Project; Technical Specification Group Radio Access Network; NR; User Equipment (UE) conformance specification; Radio transmission and reception; Part 3: Range 1 and Range 2 Interworking operation with other radios (Release 16)", V16.1.0 (Sep. 2019).
3GPP TS 38.521-4, "3rd Generation Partnership Project; Technical Specification Group Radio Access Network; NR; User Equipment (UE) conformance specification; Radio transmission and reception; Part 4: Performance requirements (Release 16)", V16.1.0 (Sep. 2019).
3GPP TS 38.522, "3rd Generation Partnership Project; Technical Specification Group Radio Access Network; NR; User Equipment (UE) conformance specification; Applicability of radio transmission, radio reception and radio resource management test cases (Release 16)", V16.1.0 (Sep. 2019).
3GPP TS 38.523-1, "3rd Generation Partnership Project; Technical Specification Group Radio Access Network; 5GS; User Equipment (UE) conformance specification; Part 1: Protocol (Release 16)", V16.1.0 (Sep. 2019).
3GPP TS 38.523-2, "3rd Generation Partnership Project; Technical Specification Group Radio Access Network; 5GS; User Equipment (UE) conformance specification; Part 2: Applicability of protocol test cases (Release 16)", V16.1.0 (Sep. 2019).
3GPP Ts 38.523-3, "3rd Generation Partnership Project; Technical Specification Group Radio Access Network; 5GS; User Equipment (UE) conformance specification; Part 3: Protocol Test Suites (Release 16)", V16.1.0 (Mar. 2021).
3GPP TS 38.533, "3rd Generation Partnership Project; Technical Specification Group Radio Access Network; NR; User Equipment (UE) conformance specification; Radio Resource Management (RRM) (Release 16)", V16.1.0 (Sep. 2019).
3GPP TR 38.828, "3rd Generation Partnership Project; Technical Specification Group Radio Access Network; Cross Link Interference (CLI) handling and Remote Interference Management (RIM) for NR; (Release 16)", V16.1.0 (Sep. 2019).
3GPP TR 38.831, "3rd Generation Partnership Project; Technical Specification Group Radio Access Network; NR; User Equipment (UE) Radio Frequency (RF) requirements for Frequency Range 2 (FR2) (Release 16)", V16.1.0 (Dec. 2020).
3GPP TR 38.866, "3rd Generation Partnership Project; Technical Specification Group Radio Access Network; Study on remote interference management for NR (Release 16)", V16.1.0 (Mar. 2019).
3GPP TR 38.886, "3rd Generation Partnership Project; Technical Specification Group Radio Access Network; V2X Services based on NR; User Equipment (UE) radio transmission and reception; (Release 16)", V16.1.0 (Sep. 2020).
3GPP TR 38.901, "3rd Generation Partnership Project; Technical Specification Group Radio Access Network; Study on channel model for frequencies from 0.5 to 100 GHZ (Release 16)", V16.1.0 (Dec. 2019).
3GPP TR 38.903, "3rd Generation Partnership Project; Technical Specification Group Radio Access Network; NR; Derivation of test tolerances and measurement uncertainty for User Equipment (UE) conformance test cases (Release 16)", V16.1.0 (Sep. 2019).
3GPP TR 38.905, "3rd Generation Partnership Project; Technical Specification Group Radio Access Network; NR; Derivation of test points for radio transmission and reception User Equipment (UE) conformance test cases (Release 16)", V16.1.0 (Sep. 2019).
3GPP TS 38.321, "3rd Generation Partnership Project; Technical Specification Group Radio Access Network; NR; Medium Access Control (MAC) protocol specification (Release 16)", V16.0.0 (Mar. 2020).
3GPP TS 38.331, "3rd Generation Partnership Project; Technical Specification Group Radio Access Network; NR; Radio Resource Control (RRC) protocol specification (Release 15)", V15.6.0 (Jun. 2019).
3GPP TS 38.214, "3rd Generation Partnership Project; Technical Specification Group Radio Access Network; NR; Physical layer procedures for data (Release 15)", V15.8.0 (Dec. 2019).
3GPP TS 38.213, "3rd Generation Partnership Project; Technical Specification Group Radio Access Network; NR; Physical layer procedures for control (Release 15)", V15.6.0 (Jun. 2019).
3GPP TS 36.213, "3rd Generation Partnership Project; Technical Specification Group Radio Access Network; Evolved Universal Terrestrial Radio Access (E-UTRA); Physical layer procedures (Release 16)", V16.0.0 (Dec. 2019).
3GPP TS 38.101-1, "3rd Generation Partnership Project; Technical Specification Group Radio Access Network; NR; User Equipment (UE) radio transmission and reception; Part 1: Range 1 Standalone (Release 16)", V16.1.0 (Sep. 2019).
3GPP TS 38.101-2, "3rd Generation Partnership Project; Technical Specification Group Radio Access Network; NR; User Equipment (UE) radio transmission and reception; Part 2: Range 2 Standalone (Release 16)", V16.1.0 (Sep. 2019).
3GPP TS 38.101-3, "3rd Generation Partnership Project; Technical Specification Group Radio Access Network; NR; User Equipment (UE) radio transmission and reception; Part 3: Range 1 and Range 2 Interworking operation with other radios (Release 16)", V16.1.0 (Sep. 2019).
3GPP TS 38.101-4, "3rd Generation Partnership Project; Technical Specification Group Radio Access Network; NR; User Equipment (UE) radio transmission and reception; Part 4: Performance requirements (Release 16)", V16.1.0 (Jun. 2020).
3GPP TS 38.104, "3rd Generation Partnership Project; Technical Specification Group Radio Access Network; NR; Base Station (BS) radio transmission and reception (Release 16)", V16.1.0 (Sep. 2019).
3GPP TS 38.113, "3rd Generation Partnership Project; Technical Specification Group Radio Access Network; NR; Base Station (BS) ElectroMagnetic Compatibility (EMC) (Release 16)", V16.1.0 (Sep. 2020).
3GPP TS 38.124, "3rd Generation Partnership Project; Technical Specification Group Radio Access Network; NR; ElectroMagnetic Compatibility (EMC) requirements for mobile terminals and ancillary equipment (Release 16)", V16.1.0 (Sep. 2020).
3GPP TS 38.133, "3rd Generation Partnership Project; Technical Specification Group Radio Access Network; NR; Requirements for support of radio resource management (Release 16)", V16.1.0 (Sep. 2019).
3GPP TS 38.141-1, "3rd Generation Partnership Project; Technical Specification Group Radio Access Network; NR; Base Station (BS) conformance testing Part 1: Conducted conformance testing (Release 16)", V16.1.0 (Sep. 2019).
3GPP TS 38.141-2, "3rd Generation Partnership Project; Technical Specification Group Radio Access Network; NR; Base Station (BS) conformance testing Part 2: Radiated conformance testing (Release 16)", V16.1.0 (Sep. 2019).
3GPP TS 38.171, "3rd Generation Partnership Project; Technical Specification Group Radio Access Network; NR; Requirements for support of Assisted Global Navigation Satellite System (A-GNSS) (Release 16)", V16.1.0 (Jun. 2021).
3GPP TS 38.174, "3rd Generation Partnership Project; Technical Specification Group Radio Access Network; NR; Integrated access and backhaul radio transmission and reception (Release 16)", V16. 1.0 (Dec. 2020).

(56) References Cited

OTHER PUBLICATIONS

3GPP TS 38.175, "3rd Generation Partnership Project; Technical Specification Group Radio Access Network; NR; Integrated access and backhaul ElectroMagnetic Compatibility (EMC) (Release 16)", V16.1.0 (Dec. 2020).

3GPP TS 38.176-1, "3rd Generation Partnership Project; Technical Specification Group Radio Access Network; NR; Integrated access and backhaul (IAB) conformance testing Part 1: Conducted conformance testing (Release 16)", V16.1.0 (Sep. 2021).

3GPP TS 38.176-2, "3rd Generation Partnership Project; Technical Specification Group Radio Access Network; NR; Integrated Access and Backhaul (IAB) conformance testing; Part 2: Radiated conformance testing; (Release 16)", V16.1.0 (Sep. 2021).

3GPP TS 38.202, "3rd Generation Partnership Project; Technical Specification Group Radio Access Network; NR; Services provided by the physical layer (Release 16)", V16.1.0 (Jun. 2020).

3GPP TS 38.211, "3rd Generation Partnership Project; Technical Specification Group Radio Access Network; NR; Physical channels and modulation (Release 16)", V16.1.0 (Mar. 2020).

\* cited by examiner

METHOD AND USER EQUIPMENT FOR RESOURCE SELECTION APPROACH ADAPTATION

CROSS-REFERENCE TO RELATED APPLICATION(S)

The present application claims the benefit of and priority to provisional U.S. Patent Application Ser. No. 63/028,502 (hereafter referred to as "the '502 provisional"), filed on May 21, 2020, entitled "ADAPTATION OF RESOURCE SELECTION METHODS FOR SIDELINK COMMUNICATION." The contents of the '502 provisional are fully incorporated herein by reference for all purposes.

FIELD

The present disclosure generally relates to wireless communication, and more particularly, to a method and a user equipment (UE) for resource selection approach adaptation.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a method and a user equipment (UE) for resource selection approach adaptation.

According to an aspect of the present disclosure, a method performed by a UE for resource selection approach adaptation is provided. The method includes receiving, from a Base Station (BS), a first Sidelink (SL) transmission resource pool configuration and a second SL transmission resource pool configuration, the first SL transmission resource pool configuration determining a first SL transmission resource pool, the second SL transmission resource pool configuration determining a second SL transmission resource pool; performing a first resource selection on the first SL transmission resource pool by applying a first resource selection approach; receiving, from the BS, an adaption indication that a second resource selection approach is to be applied; performing, during a transition period between a time at which the adaption indication is received and a time at which the second resource selection approach is applied, a second resource selection on the second SL transmission resource pool by applying a third resource selection approach; and performing, after the transition period, a third resource selection on the first SL transmission resource pool by applying the second resource selection approach indicated by the adaption indication.

According to another aspect of the present disclosure, a UE for resource selection approach adaptation is provided. The UE includes a transceiver and a processor coupled to the transceiver. The processor is configured to control the transceiver to receive, from a BS, a first SL transmission resource pool configuration and a second SL transmission resource pool configuration, the first SL transmission resource pool configuration determining a first SL transmission resource pool, the second SL transmission resource pool configuration determining a second SL transmission resource pool; perform a first resource selection on the first SL transmission resource pool by applying a first resource selection approach; control the transceiver to receive, from the BS, an adaption indication that a second resource selection approach is to be applied; perform, during a transition period between a time at which the adaption indication is received and a time at which the second resource selection approach is applied, a second resource selection on the second SL transmission resource pool by applying a third resource selection approach; and perform, after the transition period, a third resource selection on the first SL transmission resource pool by applying the second resource selection approach indicated by the adaption indication.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For the purpose of consistency and ease of understanding, like features may be identified (although, in some examples, not illustrated) by the same numerals in the drawings. However, the features in different implementations may differ in other respects and shall not be narrowly confined to what is illustrated in the drawings.

The phrases "in one implementation," or "in some implementations," may each refer to one or more of the same or different implementations. The term "coupled" is defined as connected whether directly or indirectly via intervening components and is not necessarily limited to physical connections. The term "comprising" means "including, but not necessarily limited to" and specifically indicates open-ended inclusion or membership in the disclosed combination, group, series or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details such as functional entities, techniques, protocols, standards, and the like are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuitry (ASIC), programmable logic arrays, and/or using one or more Digital Signal Processors (DSPs). Although some of the disclosed implementations are oriented to software installed and executing on computer hardware, alternative implementations implemented as firmware or as hardware or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UNITS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

In Multi-RAT Dual Connectivity (MR-DC) cases, the primary cell of a Master Cell Group (MCG) or a Secondary Cell Group (SCG) may be called a Special Cell (SpCell). A Primary Cell (PCell) may refer to the SpCell of an MCG. A Primary SCG Cell (PSCell) may refer to the SpCell of an SCG. An MCG may refer to a group of serving cells associated with the Master Node (MN), comprising the SpCell and optionally one or more Secondary Cells (SCells). An SCG may refer to a group of serving cells associated with the Secondary Node (SN), comprising the SpCell and optionally one or more SCells.

As disclosed previously, the frame structure for NR supports flexible configurations for accommodating various next-generation (e.g., 5G) communication requirements such as eMBB, mMTC, and URLLC, while fulfilling high reliability, high data rate and low latency requirements. The Orthogonal Frequency-Division Multiplexing (OFDM) technology in 3GPP may serve as a baseline for an NR waveform. The scalable OFDM numerology such as adaptive sub-carrier spacing, channel bandwidth, and Cyclic Prefix (CP) may also be used.

Two coding schemes are considered for NR, specifically Low-Density Parity-Check (LDPC) code and Polar Code. The coding scheme adaption may be configured based on channel conditions and/or service applications.

At least DL transmission data, a guard period, and an UL transmission data should be included in a transmission time interval (TTI) of a single NR frame. The respective portions of the DL transmission data, the guard period, and the UL transmission data should also be configurable based on, for example, the network dynamics of NR. SL resources may also be provided in an NR frame to support ProSe services or V2X services. In an LTE system, a TTI is a time-domain scheduling unit and is equal to 1 subframe, which is 1 millisecond (ms) in length and may include 12 or 14 symbols depending on Cyclic Prefix (CP) length. In an NR system, a TTI is denoted as a slot, which may include 12 or 14 symbols depending on CP length. A slot length may be different depending on numerology (e.g., subcarrier spacing and/or CP length). For example, for 15 kHz subcarrier spacing, 1 slot=1 ms=1 subframe. However, for 30 kHz, 1 slot=0.5 ms.

UE-side power consumption is one of major design considerations for many wireless communication systems. The demand triggered various innovative techniques for achieving power saving gain in scenarios such as cellular communication and Vehicle-to-everything (V2X) communication. For example, Connected Mode Discontinuous Reception (C-DRX) mechanism has been applied in the LTE/NR Uu interface as one of enablers for UE-side power saving, where the Uu interface may refer to a radio interface that links UE and Terrestrial Radio Access Network (T-RAN). The entry point for a T-RAN may be a Base Station such as eNB/gNB. The Uu interface allows data transfer between a UE and a eNB/gNB. In the LTE Sidelink (SL) communication, partial sensing-based resource selection and random resource selection are introduced for reducing power consumption of e.g., pedestrian UEs. Unfortunately, for NR (V2X) SL communication, there is not any power saving mechanism being introduced so far.

In LTE-based V2X SL communication, a Transmission (TX) UE is allowed to select a transmission resource(s) from a (pre-)configured transmission resource pool(s), for example, SL transmission mode 4 specified in TS 36.213 (e.g., V16.0.0). Sensing-based resource selection as well as random resource selection approaches are supported. For sensing-based resource selection approaches, full sensing-based and partial sensing-based approaches are specified.

In a random resource selection approach, a UE may identify a set of candidate resources within a resource selection window. A candidate resource is termed as Candidate Single-Subframe Resource (CSR). A CSR may define a time-frequency resource which can be used for SL data transmission. The UE may select a CSR at random for SL data transmission, as long as the CSR does not violate UE transmission capability constraints. As an example of a UE transmission capability constraint, a UE may not be able to transmit simultaneously on two specific carriers.

In a full sensing-based resource selection approach, a UE may identify a set of CSRs within a resource selection window (e.g., a valid CSR set). Further, a sensing operation in a sensing window may be performed. During the sensing operation, the UE may decode successfully one or multiple pieces of SL Control Information (SCI) from one or multiple other SL UEs. The received SCI may indicate its/their future transmission patterns. A CSR may be excluded from the valid CSR set if the CSR and its future resource reservation(s) collide with the future transmission patterns indicated by the received SCI. For subframe(s) in the sensing window that are not monitored, hypothetical SCI(s) from the subframe(s) may be assumed as received. The hypothetical SCI(s) may be used to derive potential future transmission patterns based on Radio Resource Control (RRC) configured transmission patterns. A CSR may also be excluded from the valid CSR set if the CSR or its associated future resource reservation(s) collides with the potential future transmission patterns associated with the hypothetical SCI(s). The UE may select at random a CSR from the valid CSR set.

In a partial sensing-based resource selection approach, within a resource selection window, a UE may select Y subframes from the resource selection window. The value of Y may be equal to or larger than a (pre-)configured number. CSRs associated with the selected Y subframes may constitute a valid CSR set. Further, a sensing operation in a sensing window may be performed. The sensing operation may ensure that at least a subset of subframes in the sensing window, which is derived based on at least the Y subframes and information signal from the Network (NW), will be sensed. During the sensing operation, the UE may decode successfully one or multiple pieces of SCI from one or multiple other SL UEs. The received SCI may indicate its/their future transmission patterns. A CSR may be excluded from the valid CSR set if 1) the CSR and its future resource reservation(s) collides with the future transmission patterns indicated by the received SCI. The UE may select at random a CSR from the valid CSR set.

In Release 16 (Rel-16) NR SL communication, a TX UE is also allowed to select by itself a transmission resource(s) from a (pre-)configured transmission resource pool(s) based on resource allocation mode-2, as specified in e.g., TS 38 series V16.1.0. In this environment, only full sensing-based resource selection may be supported.

Figure 1:
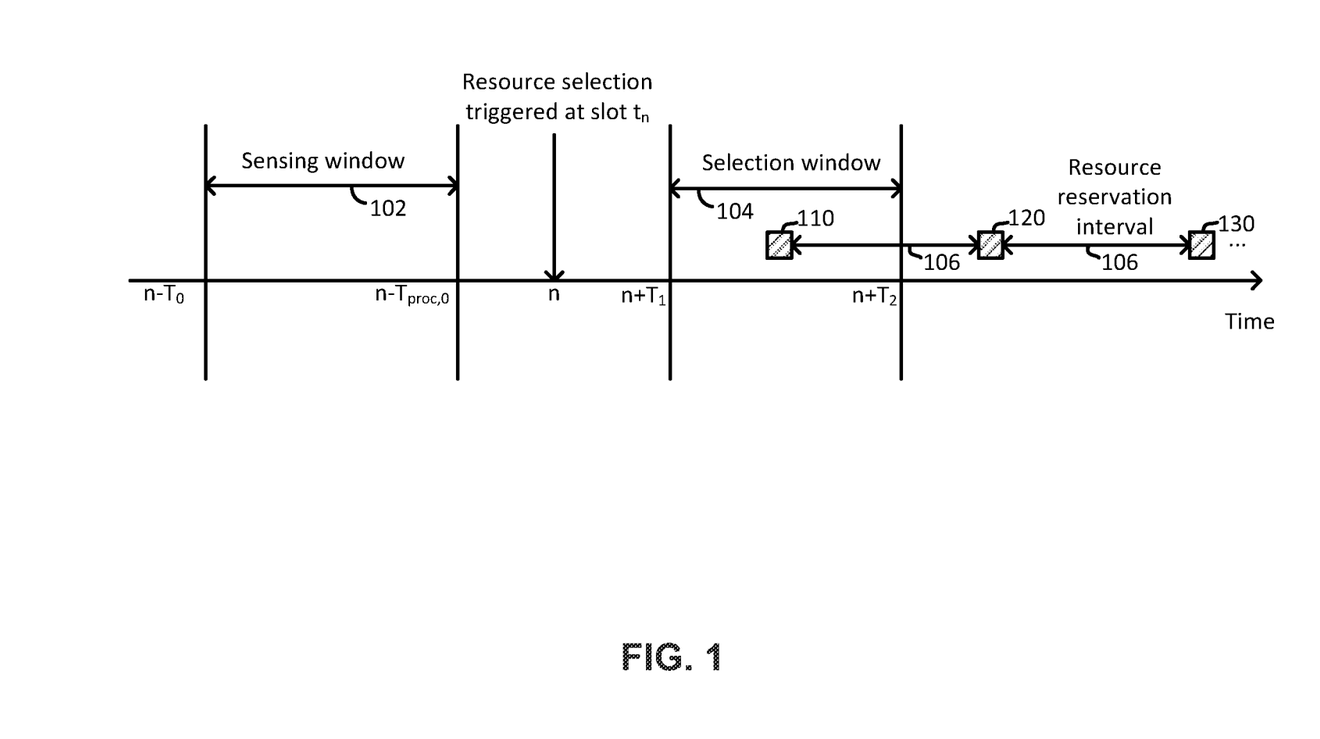
FIG. 1 illustrates a process of full sensing-based resource selection according to an implementation of the present disclosure.

FIG. 1 illustrates a process of full sensing-based resource selection according to an implementation of the present disclosure. Assuming a resource selection triggered by a UE's higher layer (for example, an RRC layer or MAC sublayer) at slot $t_n$ (where time point n is located), a (resource) selection window 104 is defined as the time duration $[n+T_1, n+T_2]$ and a sensing window 102 is defined as the time duration $[n-T_0, n-T_{proc,0}]$, where $T_0$ is a time point configured by, e.g., RRC signaling;

$T_{proc,0}$ is specified in the TS 38 series specifications to take into account the UE-processing time;

$T_1$ may be up to UE implementation but subject to the constraint: $0 \leq T_1 \leq T_{proc,1}$, where $T_{proc,1}$ is specified in the TS 38 series specifications to take into account the UE-processing time; and $T_2$ may be up to UE implementation but subject to the following constraints:

$T_{2min}(prio_{TX}) \leq T_2 \leq$ remaining Packet Delay Budget (PDB), if remaining PDB>$T_{2min}(prio_{TX})$, where $T_{2min}(prio_{TX})$ may be indicated by the NW and may be related to the priority level associated with the resource selection trigger. There may be only one priority level and thus $T_{2min}$ is simply a scalar, not a vector; and $T_2$=remaining PDB, if remaining PDB<$T_{2min}(prio_{TX})$.

Similar to LIE V2X full sensing principle, a valid Candidate Single-slot Resource (CSR) set may be derived for resource selection/reservation. As a result of resource selection trigger, a set of semi-persistent resources may be selected as illustrated in
, with the interval between the semi-persistent resources denoted as resource reservation interval 106. For each semi-persistent resource (e.g., each of semi-persistent resource 110, semi-persistent resource 120 and semi-persistent resource 130), a few associated retransmission resources of same size may also be reserved during the selection. The retransmission resources are used for retransmission of a Transport Block(s) (TB(s)).

As a result, adaptation between different resource selection approaches may be addressed for proper NR SL operation when the above-mentioned power saving mechanisms are applied.

Adaptation Between Resource Selection Approaches

Rel-16 NR SL communication currently supports only full sensing-based resource selection. If simplified resource selection approaches, such as LTE V2X partial sensing-based resource selection and/or random resource selection (e.g., as described in, for example, TS 36.213 V16.0.0), are introduced in NR SL communication framework, adaptation by the UE between different resource selection approaches may be defined. A specific timer may be introduced for the UE to autonomously activate/deactivate the Discontinuous Reception (DRX) mechanism. For example, when the specific timer is running, the DRX mechanism may be active. When the specific timer expires, the UE may deactivate the DRX mechanism autonomously. In other examples, the DRX mechanism may be active when the specific timer expires and the DRX mechanism may be deactivated when the specific timer is running. The specific timer may be (re-)started when performing UL transmission and/or DL reception. The specific timer may be (re-)started when receiving an indication from NW. The specific timer may be associated with transmission resource pool(s) configured for one UE. During the time when monitoring the transmission resource pool(s) activity is needed, for example, for sensing purposes, the specific timer may be started. It is noted that the DRX mechanism referred here may be similar to, e.g., Rel-15/16 Uu DRX operation, which is controlled by a set of timers. The specific timer may be an additional timer on top of the set of timers. In one implementation, the specific timer may affect the monitoring behavior of an SL UE, but does not allow transmissions.

Resource selection approach adaptation based on RRC signaling

An LTE V2X sensing approach may be configured by RRC signaling per resource pool. For NR SL resource selection approach adaption, RRC signaling may be used in a per-resource-pool manner as well. Such configuration may be applicable to a transmission resource pool only.

To enable DRX-dependent resource selection, an SL DRX configuration may be associated with two sets of resource pool(s). From a resource selection approach point of view, the resource pool(s) may include at least transmission resource pool(s). Among the two sets of resource pool(s), a first set of resource pool(s) may be used when a DRX operation is activated by Medium Access Control (MAC) Control Element (CE) signaling, and a second set of resource pool(s) may be used when a DRX operation is deactivated by MAC CE signaling. The switch between the first and the second set of resource pool(s) may be triggered based on the a DRX-command MAC CE or a long-DRX-command MAC CE. The DRX-command MAC CE or the long-DRX command MAC CE may be from an Uu interface or from a PC5 interface. When the MAC CE command is received, an alternative set of resource pool(s) may be applied and the original set of resource pool(s) may not be applied. A first resource selection approach for the first set of resource pool(s) may be pre-configured and a second resource selection approach for the second set of resource pool(s) may be pre-configured. The first and the second resource pool(s) may apply the same resource selection approach, which may be pre-configured.

The configuration may be implemented by providing the first set of resource pool(s) in a DRX configuration while providing the second set of resource pool(s) in an independent RRC Information Element(s) (IE(s)) not directly associated with the DRX configuration. This may be implemented by providing the two sets of resource pool(s) in a DRX configuration directly, whenever the DRX configuration is provided.

Resource Selection Approach Adaptation Based on MAC CE Signaling

Resource selection approaches, e.g., full/partial sensing-based resource selection and/or random resource selection, may be adapted via Resource Selection (RS) MAC-CE signaling. The indication from the RS MAC-CE signaling may include information on applicable transmission resource pool(s). NR SL resource selection approaches may be controlled via Uu MAC-CE signaling and/or SL MAC-CE signaling. When the RS MAC-CE signaling is received from the Uu interface of a UE, the UE may need to distribute the received information to its peer SL UE(s) via SL signaling, which may be SL SCI signaling or SL MAC-CE signaling. The peer SL UE(s) may be associated with the UE via a unicast, groupcast, or broadcast connection.

The RS MAC-CE signaling may be used for adapting between full sensing-based and partial sensing-based resource selection approaches. A sensing window for sensing-based approach may be divided into multiple time sections. For partial sensing-based resource selection, a UE may be informed (e.g., by receiving an indicator) which time sections in its sensing window need to be monitored, for example, through Uu RRC signaling. When the UE receives RS MAC-CE signaling, indicating to the UE to adapt from full-sensing to partial sensing for an indicated transmission resource pool(s), the monitored time sections in the sensing window of the UE may include a contiguous number of time sections closest to the resource selection trigger that defines the sensing window. The number of contiguous time sections may be (pre-)configured or derived from (pre-)configured parameter(s). A resource selection approach may be configured for a transmission resource pool and further RS MAC-CE signaling may be used to adapt the UE between approaches.

When a partial-sensing approach is configured by RRC, the UE may simply monitor the RRC configured time sections when adapting from full-sensing to partial-sensing, based on an RS MAC-CE signaling.

When a full-sensing approach is configured by RRC, the UE may monitor the RRC configured time sections when/after adapting from full-sensing to partial-sensing based on an RS MAC-CE signaling. In one implementation, the UE may further monitor the contiguous number of time sections closest to the resource selection trigger in the corresponding sensing window.

RS MAC-CE signaling may be used for adapting between sensing-based approach(s) and random selection approach. A resource selection approach may be configured for a transmission resource pool and further RS MAC-CE signaling may be used to adapt the UE between approaches. When sensing-based approach(s) is configured by RRC, the UE may be required to enable SL Hybrid Automatic Repeat Request (HARM) mechanism for SL transmissions when/after adapting to random resource selection based on an RS MAC-CE signaling.

A random resource selection approach may be applied in a transmission resource pool when at least one or a combination of the following conditions (1) to (4) is met.

Condition (1): An RRC parameter for the associated transmission resource pool may indicate random resource selection may be applied. The application of random resource selection may be limited to a (pre-)configured/(pre-)specified transition period.

Condition (2): RS MAC-CE signaling may indicate to the UE to adapt from a partial-sensing approach to a full-sensing approach. Random resource selection may be applied before a full sensing result is available.

Condition (3): RS MAC-CE signaling may indicate to the UE to adapt from a random selection approach to a sensing-based approach(es). Random resource selection may be applied before a sensing result is available.

Condition (4): The application of a random resource selection approach may be further subject to one or a combination of the following requirements (1) to (4):

Requirement (1): The associated transmission resource pool is provided with PSFCH resources.

Requirement (2): The concerned transmitting UE performs HARQ-based SL transmission for resource(s) selected based on random selection.

Requirement (3): The concerned transmitting UE is signaled to perform HARQ-based SL transmission by gNB.

Requirement (4): The transmission resource(s) based on random selection is associated with a service flow, unicast, groupcast or logical channel which requires/indicates HARQ-based SL transmission.

Resource Selection Approach Adaptation Based on Dynamic Signaling

Resource selection approaches, e.g., full/partial sensing-based resource selection and/or random resource selection, may be adapted via a physical layer dynamic signaling. NR SL resource selection approaches may be controlled via Uu DCI signaling and/or SL SCI signaling. When the DCI signaling is received from a Uu interface of a UE, the UE may be required to distribute the received information to its peer SL UEs via SL signaling, which may be SL SCI signaling or SL MAC-CE signaling. As described previously, a UE's peer SL UEs may be associated with the UE via a unicast, groupcast, or broadcast connection.

An SL UE may be configured with multiple SL Band-Width Parts (BWPs) and each SL BWP may be provided with different sets of transmission/reception parameters. Different resource selection approaches may be configured for different BWPs. In a sense, resource selection approach may be switched as well when an SL BWP switch is indicated by Uu DCI and/or SL SCI. A transmission resource pool(s) in a BWP may be configured with an associated resource selection approach. When receiving an SL BWP switch indication, whether to change the resource selection approach may depend on the transmission resource pool(s) configured in the new BWP. A resource selection approach may be configured based on a BWP (e.g., configured on a per-BWP basis). When receiving a SL BWP switch indication, the resource selection approach may depend on the configuration for the newly indicated BWP.

The above-mentioned dynamic signaling may be used for adapting between full sensing-based and partial sensing-based resource selection approaches. A sensing window for a sensing-based approach may be divided into multiple time sections. For a partial sensing-based resource selection, a UE may be informed (e.g., by receiving an indicator) which time sections in its sensing window need to be monitored, for example, through Uu RRC signaling. When the UE receives, e.g., a BWP switch indicating to the UE to adapt from a full-sensing resource selection BWP to a partial-sensing resource selection BWP, with both of the BWPs associated with a same transmission resource pool(s), the monitored time sections in the sensing window of the UE may include a contiguous number of time sections closest to the resource selection trigger that defines the sensing window. The number of contiguous time sections may be (pre-)configured or derived from (pre-)configured parameter(s).

The BWP switch signaling may be used for adapting between sensing-based resource selection BWP and random resource selection BWP. Such adaptation may require a UE to comply with one or a combination of the following requirements (1) to (4) when adapting to random resource selection based on a BWP switch signaling:

Requirement (1): The associated transmission resource pool is provided with PSFCH resources.

Requirement (2): The concerned transmitting UE performs HARQ-based SL transmission for resource(s) selected based on random selection.

Requirement (3): The concerned transmitting UE is signaled to perform HARQ-based SL transmission by gNB.

Requirement (4): The transmission resource(s) based on random selection is associated with a service flow, unicast, groupcast or logical channel which requires/indicates HARQ-based SL transmission.

In the above adaptation signaling, each BWP may be configured with more than one transmission resource pool and different BWPs may not be associated with a same set of transmission resource pools. If a resource selection approach is provided in a per-transmission-resource-pool manner, such as when the UE receives BWP switch signaling, transitional behavior for different transmission resource pools may not be the same. The transitional behavior for different transmission resource pools may depend on resource selection approaches before and after the adaptation signaling.

Transition period during resource selection approach adaptation

Requirements on sensing results may be different from full/partial sensing-based resource selection. When adapting from a resource selection approach with relaxed requirements to another resource selection approach with stricter requirements, a transition period may be needed for preparation. For example, when adapting from partial sensing-based resource selection to full sensing-based resource selection, and/or when adapting from a random resource selection approach to a sensing-based resource selection approach, a transition period may be needed. During such transition period, transitional behavior may be applied before sensing results are ready.

When transitioning from a partial sensing-based resource selection approach to a full sensing-based resource selection approach, the partial sensing-based resource selection and the full sensing-based resource selection may be associated with different transmission pool(s), as in, e.g., an RRC-based adaptation approach. When transitioning from a partial sensing-based resource selection approach to a full sensing-based resource selection approach, the partial sensing-based resource selection approach and the full sensing-based resource selection approach may be associated with same transmission pool(s), as in, e.g., a MAC-CE based adaptation approach and/or a dynamic signaling approach.

When transitioning from a random resource selection approach to a sensing-based resource selection approach, the random resource selection approach and the sensing-based resource selection approach may be associated with different transmission pool(s), as in, e.g., an RRC based adaptation approach. When the UE transitions from a random resource selection approach to a sensing-based resource selection approach, the random resource selection approach and the sensing-based resource selection may be associated with same transmission pool(s), as in, e.g., a MAC-CE based adaptation approach and/or a dynamic signaling approach.

The transitional UE behavior during a transition period may include one or a combination of the following options (1) and (2):

Option (1): Exceptional transmission resource pool(s) is (pre-)configured. During the transition period, an SL transmission may take place in the exceptional transmission resource pool(s). The exceptional transmission resource pool(s) may be different from the transmission resource pool(s) indicated in signaling to the UE to adapt to a particular resource selection approach. The exceptional transmission resource pool(s) may be configured by RRC with a resource selection approach, which should be applied for the transitional SL transmission(s). A random resource selection approach may be applied to a transitional SL transmission(s) taking place in the exceptional transmission resource pool(s).

Option (2): A resource selection approach before adaptation signaling may be applied in the original transmission resource pool(s) during the transition period. The resource selection approach before the adaptation signaling may be a partial sensing-based resource selection approach or a random resource selection approach, and the adaptation signaling may indicate to the UE to adapt a full sensing-based resource selection approach. The resource selection approach before the adaptation signaling may be a random resource selection approach, and the adaptation signaling may indicate to the UE to adapt a partial sensing-based resource selection approach.

Resource Selection for Partial Sensing-Based Resource Selection

In LTE V2X partial sensing-based resource selection, a UE may be signaled (e.g., by receiving an indicator) to select Y≥minNumCandidateSF subframes in a resource selection window associated with a resource selection trigger in its initial candidate resource selection set for resource selection, e.g., TS 36.213 V16.0.0. The value of minNumCandidateSF may be configured by RRC signaling. The resource selection window may be defined as [n+T1, n+T2], where n is the trigger time of the resource selection trigger. In NR V2X, a similar resource selection window has been defined, with a slightly more involved definition of the T1 value and the T2 value.

For an NR V2X partial sensing-based resource selection approach, a down selection of candidate subframes/slots in a resource selection window similar to Y≥minNumCandidateSl slots may be introduced as well. However, different from LTE V2X, NR V2X may support advanced V2X use cases with stringent reliability and latency requirements. Setting a constraint Y≥minNumCandidateSl on resource selection may lead to a case where minNumCandidateSl is larger than the resource selection window length. This is because the determination of the resource selection window has taken into account the Packet Delay Budget (PDB), whereas the selection of Y does not. To resolve this issue, an SL UE may select Y≥min(minNumCandidateSl, remaining PDB) slots as an initial candidate resource selection set. The value of minNumCandidateSl may be configured by RRC signaling, and the PDB may be associated with the packet that results in the resource selection trigger. Resource selection for the concerned resource selection trigger may be degraded from partial sensing-based selection to random resource selection when one or a combination of the following conditions (1) and (2) is met:

Condition (1): minNumCandidateSl is equal to or larger than the remaining PDB. The remaining PDB is associated with the packet that results in the concerned resource selection trigger.

Condition (2): minNumCandidateSl is equal to or larger than the resource selection window length of the concerned resource selection trigger.

Figure 2:
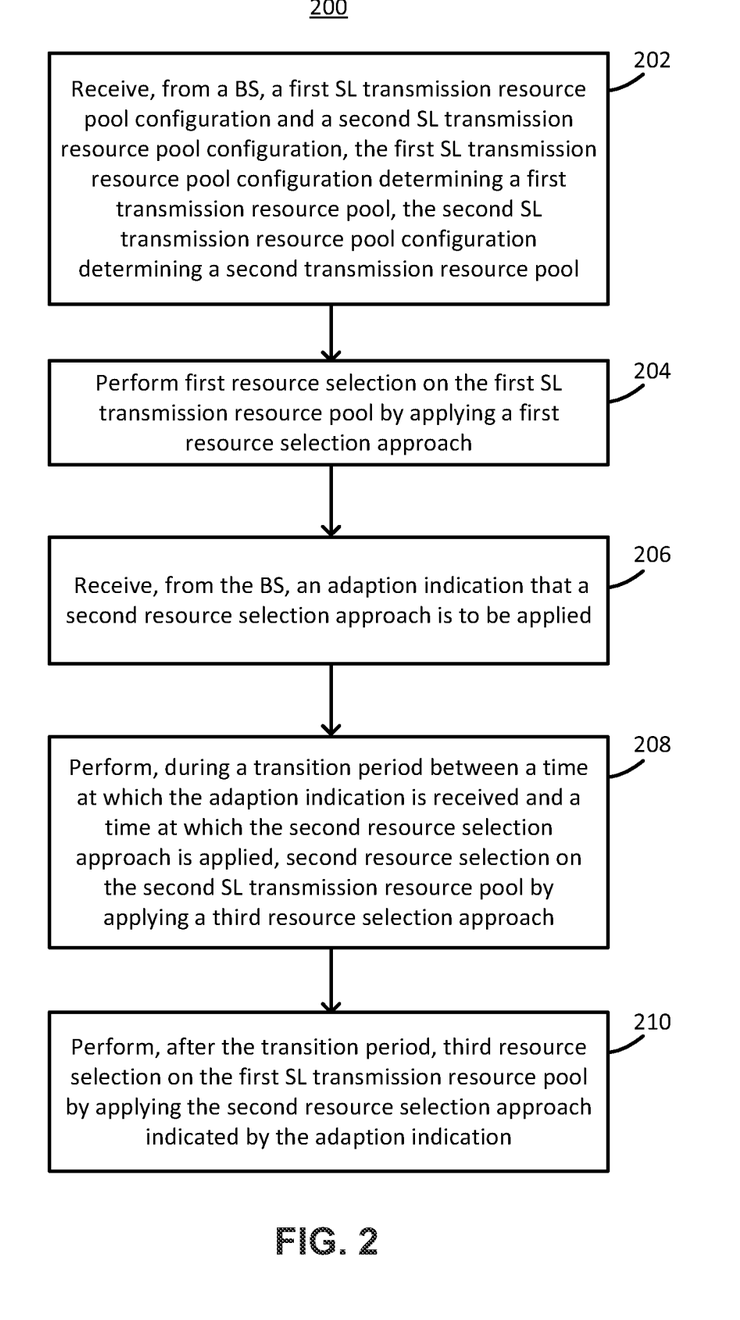
FIG. 2 illustrates a flowchart for a method for resource selection approach adaptation according to an implementation of the present disclosure.

FIG. 2 illustrates a flowchart for a method 200 for resource selection approach adaptation according to an implementation of the present disclosure. Although actions 202, 204, 206, 208 and 210 are illustrated as separate actions represented as independent blocks in FIG. 2, these separately illustrated actions should not be construed as necessarily order dependent. The order in which the actions are performed in FIG. 2 is not intended to be construed as a limitation, and any number of the disclosed blocks may be combined in any order to implement the method, or an alternate method. Moreover, each of actions 202, 204, 206, 208 and 210 may be performed independent of other actions, and can be omitted in some implementations of the present disclosure.

In action 202, a UE may receive, from a BS, a first SL transmission resource pool configuration and a second SL transmission resource pool configuration. The first SL transmission resource pool configuration may determine a first transmission resource pool. The second SL transmission resource pool configuration may determine a second transmission resource pool.

The first transmission resource pool may include a first set of resources determined by a first resource allocation (including resource location, occurrence period, etc.) indicated by the parameter(s) included in the first SL transmission resource pool configuration. The second transmission resource pool may include a second set of resources determined by a second resource allocation (including resource location, occurrence period, etc.) indicated by the parameter(s) included in the second SL transmission resource pool configuration. The second transmission resource pool may include at least one Physical Sidelink Feedback Channel (PSFCH) resource. The second SL transmission resource pool configuration may be included in an RRC message from the BS.

In action 204, the UE may perform a first resource selection on the first SL transmission resource pool by applying a first resource selection approach.

In action 206, the UE may receive, from the BS, an adaption indication that a second resource selection approach is to be applied. The adaption indication may be included in DCI signaling, MAC CE signaling, or RRC signaling in some embodiments. In the present disclosure, the term "adaption indication" and the term "adaptation signaling" may be utilized interchangeably.

In action 208, the UE may perform, during a transition period between a time at which the adaption indication is received and a time at which the second resource selection approach is applied, a second resource selection on the second SL transmission resource pool by applying a third resource selection approach.

In action 210, the UE may perform, after the transition period, a third resource selection on the first SL transmission resource pool by applying the second resource selection approach indicated by the adaption indication.

Each of the first resource selection approach, the second resource selection approach and the third resource selection approach, in some embodiments, may be one of the following:

a full sensing-based resource selection approach in which the UE selects a resource for SL transmission based on a first sensing result obtained by sensing a plurality of time sectors of a sensing window, a partial sensing-based resource selection approach in which the UE selects the resource for SL transmission based on a second sensing result obtained by sensing a portion of the plurality of time sectors of the sensing window, and a random resource selection approach in which the UE selects the resource for SL transmission randomly.

For example, if the full sensing-based resource selection approach is applied as the first/second resource selection approach, the UE may select a resource (e.g., in a selection window) from the first SL transmission resource pool based on a sensing result obtained by sensing a plurality of time sectors (e.g., all time sectors) of the corresponding sensing window. If the partial sensing-based resource selection approach is applied as the first/second resource selection approach, the UE may select a resource (e.g., in a selection window) from the first SL transmission resource pool based on a sensing result obtained by sensing only a portion of the corresponding sensing window. If the random resource selection approach is applied as the first/second resource selection, the UE may randomly select a resource for SL transmission, in a resource selection window, from the first transmission resource pool without using any sensing result(s), or without performing sensing in the corresponding the sensing window.

Regarding the third resource selection approach, if it is a full sensing-based resource selection approach, the UE may select a resource (e.g., in a selection window) from the second SL transmission resource pool based on a sensing result obtained by sensing a plurality of time sectors (e.g., all time sectors) of the corresponding sensing window. If the third resource selection approach is a partial sensing-based resource selection approach, the UE may select a resource (e.g., in a selection window) from the second SL transmission resource pool based on a sensing result obtained by sensing only a portion of the corresponding sensing window. If the third resource selection approach is a random resource selection approach, the UE may randomly select, in a selection window, a resource for SL transmission from the second transmission resource pool without using any sensing result(s) or without performing sensing in the corresponding sensing window.

An example of the sensing window and the selection window described previously is illustrated in FIG. 1, where the sensing window 102 may be considered as "corresponding to" the selection window 104 since the UE may use the sensing result obtained by sensing at least part of the sensing window 102 (depending on a full sensing-based or partial sensing-based resource selection approach) to perform resource selection in the selection window 104. In the present disclosure, a sensing result may refer to measurement data obtained by a UE performing sensing/measurement on a time-frequency domain resource(s). A sensing result may be represented by an indicator(s)/value(s)/parameter(s) used to indicate the channel quality and/or signal strength of the sensed/measured time-frequency domain resource(s).

The second resource selection approach may have a stricter sensing requirement than the first resource selection approach. In the present disclosure, a stricter sensing requirement may refer to a denser and/or more complete sensing sampling over a specific period of time (e.g., a sensing window). In this sense, a full sensing-based resource selection approach may have a stricter sensing requirement than a partial sensing-based resource selection approach, and a partial sensing-based resource selection approach may have a stricter sensing requirement than a random resource selection approach. For example, in a case that the first resource selection approach is a partial sensing-based resource selection approach, the second resource approach may be a full sensing-based resource selection approach. For example, in a case that the first resource selection approach is a random resource selection approach, the second resource approach may be a partial sensing-based resource selection approach. For example, in a case that the first resource selection approach is a random resource selection approach, the second resource approach may be a full sensing-based resource selection approach. For example, the third resource selection approach may be a random resource selection approach.

With the method 200, even if a UE cannot immediately apply an indicated resource selection approach (e.g., the second resource selection approach) after receiving the adaption indication, during the transition period, the UE is still able to perform resource selection for SL transmission from a predetermined resource pool (e.g., the second resource selection approach) by applying a predetermined resource selection approach (e.g., the third resource selection approach). Therefore, inappropriate interruption of SL transmission can be effectively avoided, thereby improving transmission efficiency between devices.

Figure 3:
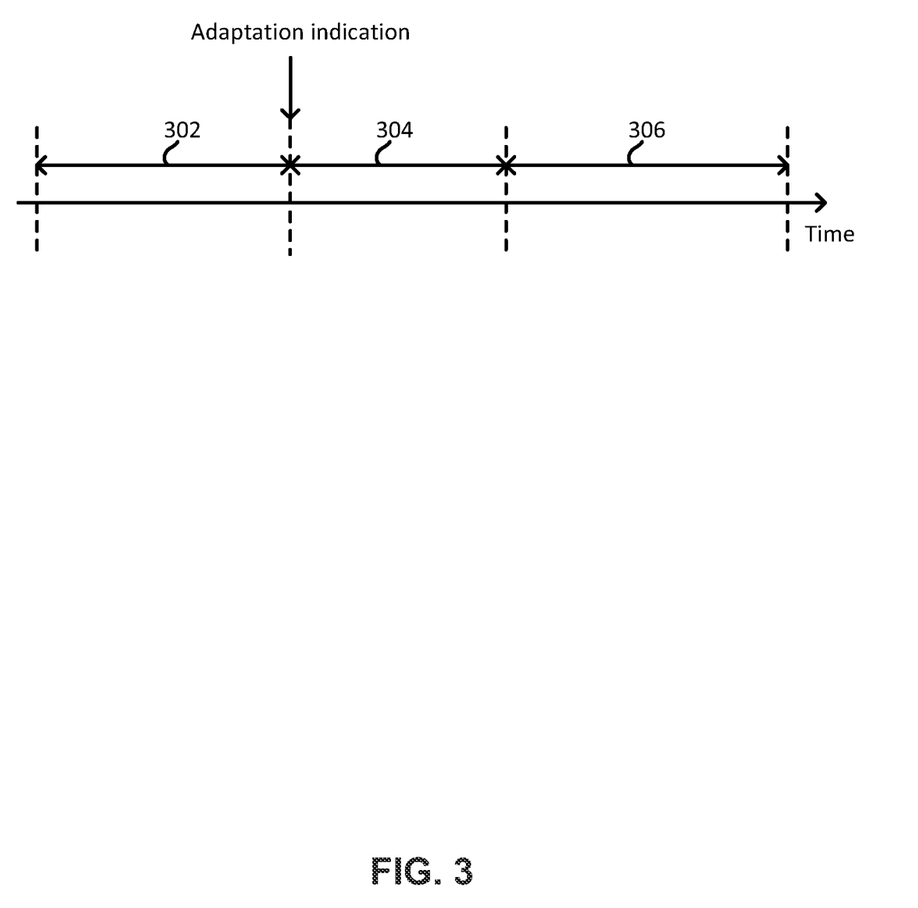
FIG. 3 is a schematic diagram of a process for resource selection approach adaptation according to an implementation of the present disclosure.

FIG. 3 is a schematic diagram of a process for resource selection approach adaptation according to an implementation of the present disclosure. As illustrated in FIG. 3, during a first time period 302, the UE may apply a first resource selection to perform resource selection for SL transmission. Upon reception of an adaption indication indicating a second resource selection approach to be applied from the network, the UE may enter a transition period 304. The occurrence of the transition period 304 may be caused by the required processing time for the adaptation indication and/or other capability limitations of the UE. During the transition period 304, a UE may perform resource selection for SL transmission by applying a third resource selection approach, which may be predetermined or preconfigured by the network through, e.g., RRC signaling. After the transition period 304, the UE may follow the adaption indication to apply the second resource selection approach to perform resource selection during a second time period 306.

The following may be used to further disclose terms, examples, embodiments, implementations, actions, and/or behaviors:

Beam: the term "beam" here may be replaced by spatial filter. For example, when UE reports a preferred gNB TX beam, UE is essentially selecting a spatial filter used by gNB. The term "beam information" may be used to provide information about which beam/spatial filter is being used/selected. In one embodiment, individual reference signals are transmitted by applying individual beams (spatial filters). Thus, the term beam or beam information may be represented by reference signal resource index(es).

Antenna Panel: An antenna panel is a conceptual term for UE antenna implementation. It may be assumed that a panel is an operational unit for controlling a transmit spatial filter (beam). A panel typically includes a plurality of antenna elements. In one implementation, a beam may be formed by a panel, and in order to form two beams simultaneously, two panels may be needed. Such simultaneous beamforming from multiple panels may be subject to UE capability. A similar definition for "panel" may be possible by applying spatial receiving filtering characteristics.

HARQ: A functionality may ensure delivery between peer entities at Layer 1 (i.e., Physical Layer). A single HARQ process may support one Transport Block (TB) when the physical layer is not configured for downlink/uplink spatial multiplexing, and when the physical layer is configured for downlink/uplink spatial multiplexing, a single HARQ process may support one or multiple TBs. There may be one HARQ entity per serving cell. Each HARQ entity may support a parallel (number) of DL and UL HARQ process.

Timer: A MAC entity may set up one or more timers for individual purposes, for example, triggering some uplink signaling retransmission or limiting some uplink signaling retransmission period. A timer may be running once it is started, until it is stopped or until it expires; otherwise, it may not be running. A timer may be started if it is not running or restarted if it is running. A Timer may be started or restarted from its initial value. In some examples, the initial value may be configured by the gNB via downlink RRC signaling.

BWP: A subset of the total cell bandwidth of a cell may be referred to as a Bandwidth Part (BWP) and beamwidth part adaptation may be achieved by configuring the UE with BWP(s) and telling the UE which of the configured BWPs is currently the active one. To enable Bandwidth Adaptation (BA) on the PCell, the gNB may configure the UE with UL and DL BWP(s). To enable BA on SCells in case of CA, the gNB may configure the UE with DL BWP(s) at least (e.g., there may be none in the UL). For the PCell, the initial BWP may be the BWP used for initial access. For the SCell(s), the initial BWP may be the BWP configured for the UE to first operate at SCell activation. The UE may be configured with a first active uplink BWP by a firstActiveUplinkBWP IE. If the first active uplink BWP is configured for an SpCell, the firstActiveUplinkBWP IE field may contain the ID of the UL BWP to be activated upon performing the RRC (re-)configuration. If the field is absent, the RRC (re-)configuration may not impose a BWP switch. If the first active uplink BWP is configured for an SCell, the firstActiveUplinkBWP IE field may contain the ID of the uplink bandwidth part to be used upon MAC-activation of an SCell.

Quasi Co-Location (QCL): Two antenna ports are said to be quasi co-located if properties of the channel over which a symbol on one antenna port is conveyed can be inferred from the channel over which a symbol on the other antenna port is conveyed. The "properties of the channel" above may include Doppler shift, Doppler spread, average delay, delay spread, and spatial RX parameters. These properties may be categorized into different QCL types in NR specifications. For example, QCL-TypeD refers to spatial RX parameter. QCL-TypeD is also referred to as a "beam" in this document.

Transmission Configuration Indicator (TCI) state: A TCI state may contain parameters for configuring a QCL relationship between one or two DL reference signals and a target reference signal set. For example, a target reference signal set may be the DM-RS ports of PDSCH or PDCCH.

Figure 4:
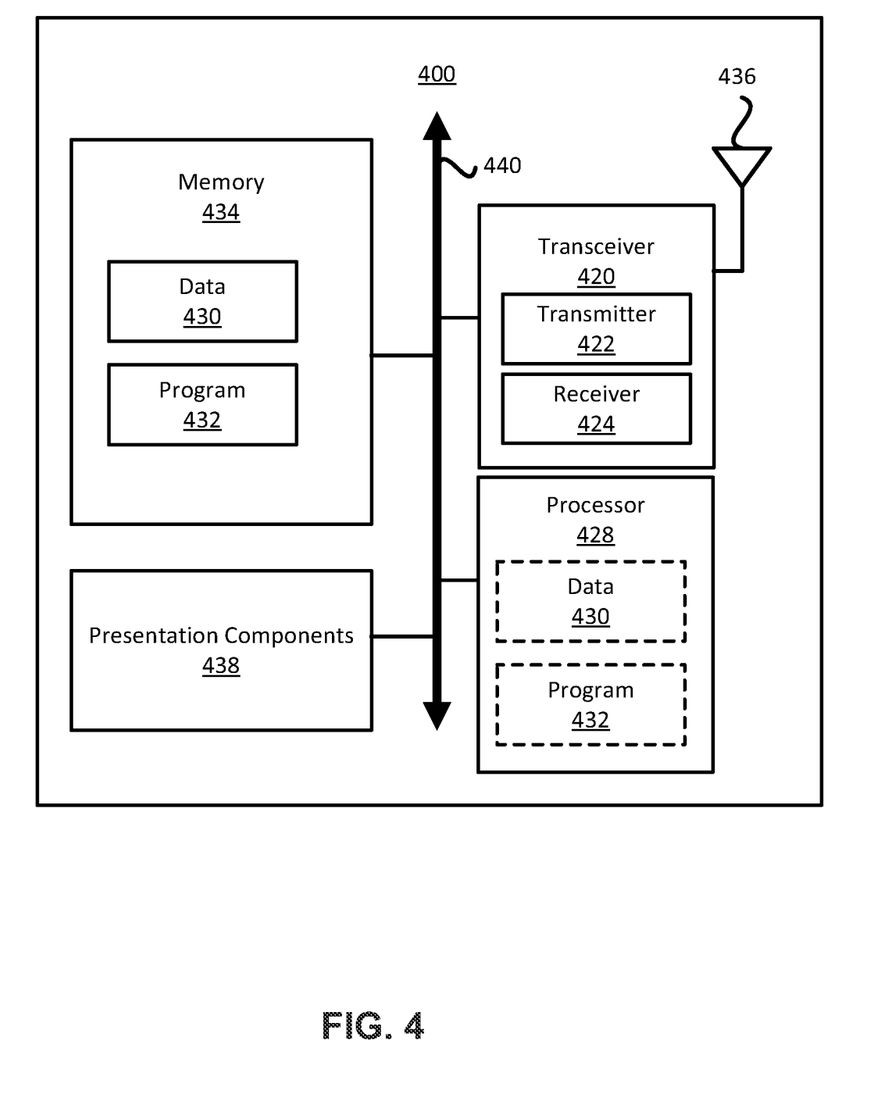
FIG. 4 is a block diagram illustrating a node for wireless communication according to an implementation of the present disclosure.

FIG. 4 is a block diagram illustrating a node 400 for wireless communication according to an implementation of the present disclosure. As illustrated in FIG. 4, a node 400 may include a transceiver 420, a processor 428, a memory 434, one or more presentation components 438, and at least one antenna 436. The node 400 may also include a radio frequency (RF) spectrum band module, a BS communications module, a network communications module, and a system communications management module, Input/Output (I/O) ports, I/O components, and a power supply (not illustrated in FIG. 4).

Each of the components may directly or indirectly communicate with each other over one or more buses 440. The node 400 may be a UE or a BS that performs various functions disclosed with reference to FIGS. 1 through 3.

The transceiver 420 has a transmitter 422 (e.g., transmitting/transmission circuitry) and a receiver 424 (e.g., receiving/reception circuitry) and may be configured to transmit and/or receive time and/or frequency resource partitioning information. The transceiver 420 may be configured to transmit in different types of subframes and slots including but not limited to usable, non-usable and flexibly usable subframes and slot formats. The transceiver 420 may be configured to receive data and control channels.

The node 400 may include a variety of computer-readable media. Computer-readable media may be any available media that may be accessed by the node 400 and include volatile (and/or non-volatile) media and removable (and/or non-removable) media.

The computer-readable media may include computer-storage media and communication media. Computer-storage media may include both volatile (and/or non-volatile media), and removable (and/or non-removable) media implemented in any method or technology for storage of information such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules or other data in a modulated data signal such as a carrier wave or other transport mechanisms and include any information delivery media.

The term "modulated data signal" may mean a signal that has one or more of its characteristics set or changed in such a manner as to encode information in the signal. Communication media may include wired media such as a wired network or direct-wired connection, and wireless media such as acoustic, RF, infrared and other wireless media. Combinations of any of the previously listed components should also be included within the scope of computer-readable media.

The memory 434 may include computer-storage media in the form of volatile and/or non-volatile memory. The memory 434 may be removable, non-removable, or a combination thereof. Example memory may include solid-state memory, hard drives, optical-disc drives, etc. As illustrated in FIG. 4, the memory 434 may store a computer-readable and/or computer-executable program 432 (e.g., software codes) that are configured to, when executed, cause the processor 428 to perform various functions disclosed herein, for example, with reference to FIGS. 1 through 3. Alternatively, the program 432 may not be directly executable by the processor 428 but may be configured to cause the node 400 (e.g., when compiled and executed) to perform various functions disclosed herein.

The processor 428 (e.g., having processing circuitry) may include an intelligent hardware device, e.g., a Central Processing Unit (CPU), a microcontroller, an ASIC, etc. The processor 428 may include memory. The processor 428 may process the data 430 and the program 432 received from the memory 434, and information transmitted and received via the transceiver 420, the base band communications module, and/or the network communications module. The processor 428 may also process information to send to the transceiver 420 for transmission via the antenna 436 to the network communications module for transmission to a CN.

One or more presentation components 438 may present data indications to a person or another device. Examples of presentation components 438 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a user equipment (UE) for resource selection approach adaptation, the method comprising:
receiving, from a Base Station (BS), a first Sidelink (SL) transmission resource pool configuration and a second SL transmission resource pool configuration, the first SL transmission resource pool configuration determining a first SL transmission resource pool, the second SL transmission resource pool configuration determining a second SL transmission resource pool;
performing a first resource selection on the first SL transmission resource pool by applying a first resource selection approach;
while or after performing the first resource selection, receiving, from the BS, an adaption indication indicating that a second resource selection approach is to be applied;
entering a transition period in response to receiving the adaption indication, the transition period being a time period between receiving the adaption indication and applying the second resource selection approach indicated by the adaption indication;
performing, during the transition period, a second resource selection on the second SL transmission resource pool, which is determined by the second SL transmission resource pool configuration, by applying a third resource selection approach; and
performing, after the transition period, a third resource selection on the first SL transmission resource pool by applying the second resource selection approach indicated by the adaption indication.

2. The method according to claim 1, wherein each of the first resource selection approach, the second resource selection approach, and the third resource selection approach is one of:
a full sensing-based resource selection approach comprising selecting, by the UE, a resource for SL transmission based on a first sensing result obtained by sensing a plurality of time sectors of a sensing window;
a partial sensing-based resource selection approach comprising selecting, by the UE, the resource for the SL transmission based on a second sensing result obtained by sensing a portion of the plurality of time sectors of the sensing window; and
a random resource selection approach comprising selecting, by the UE, the resource for the SL transmission randomly.

3. The method according to claim 2, wherein the second resource selection approach has a stricter sensing requirement than the first resource selection approach.

4. The method according to claim 3, wherein the first resource selection approach comprises the partial sensing-based resource selection approach, and the second resource selection approach comprises the full sensing-based resource selection approach.

5. The method according to claim 3, wherein the first resource selection approach comprises the random resource selection approach, and the second resource selection approach comprises the partial sensing-based resource selection approach.

6. The method according to claim 3, wherein the first resource selection approach comprises the random resource selection approach, and the second resource selection approach comprises the full sensing-based resource selection approach.

7. The method according to claim 3, wherein the third resource selection approach comprises the random resource selection approach.

8. The method according to claim 1, wherein the second SL transmission resource pool includes at least one Physical Sidelink Feedback Channel (PSFCH) resource.

9. The method according to claim 1, wherein the adaption indication is included in one of Downlink Control Information (DCI) signaling, Medium Access Control (MAC) Control Element (CE) signaling, and Radio Resource Control (RRC) signaling.

10. The method according to claim 1, wherein the second SL transmission resource pool configuration is included in a Radio Resource Control (RRC) message received from the BS.

11. A User Equipment (UE) for resource selection approach adaptation, the UE comprising:
at least one processor; and
at least one non-transitory computer-readable medium coupled to the at least one processor and storing one or more computer-executable instructions that, when executed by the at least one processor, cause the UE to:
receive, from a Base Station (BS), a first Sidelink (SL) transmission resource pool configuration and a second SL transmission resource pool configuration, the first SL transmission resource pool configuration determining a first SL transmission resource pool, the second SL transmission resource pool configuration determining a second SL transmission resource pool;
perform a first resource selection on the first SL transmission resource pool by applying a first resource selection approach;

while or after performing the first resource selection, receive, from the BS, an adaption indication indicating that a second resource selection approach is to be applied;

enter a transition period in response to receiving the adaption indication, the transition period being a time period between receiving the adaption indication and applying the second resource selection approach indicated by the adaption indication;

perform, during the transition period, a second resource selection on the second SL transmission resource pool, which is determined by the second SL transmission resource pool configuration, by applying a third resource selection approach; and perform, after the transition period, a third resource selection on the first SL transmission resource pool by applying the second resource selection approach indicated by the adaption indication.

12. The UE according to claim 11, wherein each of the first resource selection approach, the second resource selection approach and the third resource selection approach is one of a full sensing-based resource selection approach comprising the UE selecting a resource for SL transmission based on a first sensing result obtained by sensing a plurality of time sectors of a sensing window;

a partial sensing-based resource selection approach comprising the UE selecting the resource for the SL transmission based on a second sensing result obtained by sensing a portion of the plurality of time sectors of the sensing window; and a random resource selection approach comprising the UE selecting the resource for the SL transmission randomly.

13. The UE according to claim 12, wherein the second resource selection approach has a stricter sensing requirement than the first resource selection approach.

14. The UE according to claim 13, wherein the first resource selection approach comprises the partial sensing-based resource selection approach, and the second resource selection approach comprises the full sensing-based resource selection approach.

15. The UE according to claim 13, wherein the first resource selection approach comprises the random resource selection approach, and the second resource selection approach comprises the partial sensing-based resource selection approach.

16. The UE according to claim 13, wherein the first resource selection approach comprises the random resource selection approach, and the second resource selection approach comprises the full sensing-based resource selection approach.

17. The UE according to claim 13, wherein the third resource selection approach comprises the random resource selection approach.

18. The UE according to claim 11, wherein the second SL transmission resource pool includes at least one Physical Sidelink Feedback Channel (PSFCH) resource.

19. The UE according to claim 11, wherein the adaption indication is included in one of Downlink Control Information (DCI) signaling, Medium Access Control (MAC) Control Element (CE) signaling, and Radio Resource Control (RRC) signaling.

20. The UE according to claim 11, wherein the second SL transmission resource pool configuration is included in a Radio Resource Control (RRC) message received from the BS.

* * * * *